(12) United States Patent
Kwan et al.

(10) Patent No.: US 10,097,982 B2
(45) Date of Patent: *Oct. 9, 2018

(54) COMMUNICATING LOCATION SPECIFIC EMERGENCY INFORMATION TO A MOBILE DEVICE

(71) Applicant: International Business Machines Corporation, Armonk, NY (US)

(72) Inventors: Hung Tack Kwan, Grand Prairie, TX (US); Christian E. Loza, Denton, TX (US); Olivia G. Loza, Denton, TX (US); Mathews Thomas, Flower Mound, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/798,260

(22) Filed: Oct. 30, 2017

(65) Prior Publication Data

US 2018/0049012 A1     Feb. 15, 2018

Related U.S. Application Data

(63) Continuation of application No. 14/953,693, filed on Nov. 30, 2015, now Pat. No. 9,860,724.

(51) Int. Cl.
*H04W 4/90* (2018.01)
*H04W 76/02* (2009.01)
(Continued)

(52) U.S. Cl.
CPC .............. *H04W 4/90* (2018.02); *H04W 4/043* (2013.01); *H04W 4/22* (2013.01); *H04W 76/023* (2013.01); *H04W 76/14* (2018.02)

(58) Field of Classification Search
CPC ..... H04W 4/22; H04W 76/00; H04W 76/002; H04W 76/005; H04W 76/007;
(Continued)

(56) References Cited

U.S. PATENT DOCUMENTS

| 7,098,787 | B2 | 8/2006 | Miller | |
| 7,483,917 | B2 * | 1/2009 | Sullivan | ................. G06T 17/05 |

(Continued)

FOREIGN PATENT DOCUMENTS

| CN | 1960499 A | 5/2007 |
| CN | 1972517 A | 5/2007 |

(Continued)

*Primary Examiner* — Meless Zewdu
(74) *Attorney, Agent, or Firm* — Cuenot, Forsythe & Kim, LLC

(57) ABSTRACT

An occurrence of an emergency situation pertinent to people presently located within a venue can be identified. Responsive to identifying the emergency situation pertinent to the people located within the venue, an emergency alert can be automatically communicated to a first mobile device. The emergency alert can provide contextual information pertaining to the emergency situation, wherein the contextual information indicates precautions to be observed by the user. The emergency alert can be configured to be presented by the first mobile device to the user to alert the user to the emergency situation.

20 Claims, 3 Drawing Sheets

(51) Int. Cl.
*H04W 4/04* (2009.01)
*H04W 4/22* (2009.01)
*H04W 76/14* (2018.01)

(58) Field of Classification Search
CPC . H04W 76/02; H04W 76/023; H04W 76/025; H04W 4/02; H04W 4/021; H04W 4/025; H04W 4/04; H04W 4/043; H04W 68/00; H04W 68/005; H04W 4/90; H04W 76/50; H04W 76/14; H04W 4/70; H04W 4/80; H04W 28/021; H04W 84/18; H04W 84/20; H04W 4/14; H04W 16/20; H04W 16/225; H04W 12/00; H04W 12/08; H04M 11/04; H04M 11/085; H04M 2242/30
See application file for complete search history.

(56) References Cited

U.S. PATENT DOCUMENTS

| | | | |
|---|---|---|---|
| 7,720,431 | B2 | 5/2010 | Lee |
| 8,755,767 | B2 | 6/2014 | Maier et al. |
| 9,860,724 | B2* | 1/2018 | Kwan .............. H04W 4/22 |
| 2004/0239498 | A1* | 12/2004 | Miller ............ G08B 25/016 340/539.13 |
| 2006/0247849 | A1 | 11/2006 | Mohsini et al. |
| 2007/0001904 | A1* | 1/2007 | Mendelson ......... G01C 21/206 342/450 |
| 2007/0049259 | A1* | 3/2007 | Onishi ............... A62B 99/00 455/414.2 |
| 2009/0174566 | A1* | 7/2009 | Volk ............... G08B 27/005 340/691.5 |
| 2010/0121567 | A1 | 5/2010 | Mendelson |
| 2010/0190479 | A1* | 7/2010 | Scott ................ G06F 17/289 455/414.1 |
| 2011/0066374 | A1* | 3/2011 | Hartman ............. G01C 21/20 701/533 |
| 2011/0136463 | A1* | 6/2011 | Ebdon .............. G01C 21/20 455/404.1 |
| 2012/0163380 | A1* | 6/2012 | Kolbe ............... H04L 12/1895 370/390 |
| 2013/0017802 | A1* | 1/2013 | Adibi ............... H04W 40/22 455/404.1 |
| 2014/0222329 | A1* | 8/2014 | Frey ............... G08B 7/066 701/423 |
| 2015/0038178 | A1 | 2/2015 | Chin et al. |
| 2016/0049064 | A1 | 2/2016 | McNabb et al. |
| 2016/0161269 | A1* | 6/2016 | Needham .......... G01C 21/3438 701/410 |
| 2016/0269882 | A1 | 9/2016 | Balthasar et al. |
| 2016/0327947 | A1 | 11/2016 | Ishikawa et al. |
| 2016/0381537 | A1 | 12/2016 | R et al. |
| 2017/0156042 | A1 | 6/2017 | Kwan et al. |
| 2017/0365140 | A1* | 12/2017 | McMahan ............ G08B 25/08 |

FOREIGN PATENT DOCUMENTS

| | | |
|---|---|---|
| CN | 101272567 A | 9/2008 |
| CN | 100461971 C | 2/2009 |
| CN | 101345882 B | 9/2010 |
| CN | 101282504 B | 5/2011 |
| WO | 2013174441 A1 | 11/2013 |

* cited by examiner

200

```
┌─────────────────────────────────────────────────────────────┐
│ Identify an occurrence of an emergency situation pertinent  │
│                to people presently located within a venue   │
│                              205                            │
└─────────────────────────────────────────────────────────────┘
                              │
                              ▼
┌─────────────────────────────────────────────────────────────┐
│ Responsive to identifying the emergency situation pertinent │
│ to the people located within the venue, automatically       │
│ communicate, using a processor, an emergency alert and      │
│ location specific emergency information to a first mobile   │
│ device, the location specific emergency information         │
│ describing an emergency plan for exiting the venue from a   │
│ present location of the first mobile device within the      │
│ venue, wherein the location specific emergency information  │
│ is configured to be presented by the first mobile device to │
│ a user of the first mobile device to safely guide the user  │
│ from the present location to an exit of the venue           │
│                              210                            │
└─────────────────────────────────────────────────────────────┘
                              │
                              ▼
┌─────────────────────────────────────────────────────────────┐
│ Automatically communicate to the first mobile device         │
│ emergency propagation information, the emergency            │
│ propagation information configured to be processed by the   │
│ first mobile device to initiate the first mobile device to  │
│ establish a communication link with at least a second       │
│ mobile device and communicate from the first mobile device  │
│ to the second mobile device the emergency alert and the     │
│ location specific emergency information                     │
│                              215                            │
└─────────────────────────────────────────────────────────────┘
```

FIG. 2

COMMUNICATING LOCATION SPECIFIC EMERGENCY INFORMATION TO A MOBILE DEVICE

BACKGROUND

The present invention relates to mobile communications and, more particularly, to emergency related mobile communications.

Emergency procedures, exit locations, and other potential lifesaving information oftentimes are provided in commercial buildings, but are usually accessible as diagrams or depictions, posted in limited places, or as videos posted in limited places at limited times. As an example, in certain municipalities, public transportation vehicles, such buses, taxis and airplanes, are required to present to passengers emergency exit procedures using schematic images or videos. Such schematic images and videos oftentimes lack detailed explanation and are general in nature. In addition, they usually do not present a step-by-step algorithm customized based on the specific location, situation or emergency. Moreover, passengers do not necessarily have procedures readily available if needed. For example, a hotel may post an emergency exit schematic diagram in hotel rooms, but once customers leave their hotel rooms, they may not find any other emergency exit diagrams while attempting to leave the hotel during an emergency.

U.S. Pat. No. 7,098,787 discloses "[a] mobile device receives proximity location information from at least one location identification beacon. A user of the mobile device dials an emergency telephone number when an emergency occurs. Dialing the emergency telephone number enables the proximity location information to be transmitted to an emergency call center." During an emergency, however, users, may find it distracting and cumbersome to have to dial an emergency telephone number.

U.S. Pat. No. 8,755,767 discloses a "method and system provide a current physical geographic location for a mobile device (e.g., building address, a building floor, a room on a building floor, campus, enterprise, city, state, region, country, continent, etc.), in an emergency situation such as an accident, fire, terrorist attack, military incident, etc. and forward the physical geographic location to a legacy 911 network or a Emergency Services IP networks (ESInet)." Such operation, however, does not help guide people safely out of a structure.

U.S. Pat. No. 7,720,431 discloses a "mobile wireless system (10) includes a transmitter such as a satellite (18) that broadcasts wireless signals such as boundaries for specific areas to a mobile receiving device (22). Mobile receiving device (22) may include an antenna (26) and a mobile receiving device (28). A locating receiver (50) is used to generate locating signals so that a determination may be made to the location of the mobile receiving device. When the location is outside an area of interest the area of interest may be extended to provide services to the mobile device. Emergency information is broadcast to a first area. An emergency announcement indicator is also broadcast into a first area and an area outside the first area. The location of the mobile receiving device is compared to the first area and the emergency information is displayed when the location is within the first area." Thus, a user must be located in proximity of where the emergency announcement indicator is broadcast in order to receive the emergency announcement.

SUMMARY

A method includes identifying an occurrence of an emergency situation pertinent to people presently located within a venue. The method also can include, responsive to identifying the emergency situation pertinent to the people located within the venue, automatically communicating an emergency alert to a first mobile device, the emergency alert providing contextual information pertaining to the emergency situation, wherein the contextual information indicates precautions to be observed by the user, wherein the emergency alert is configured to be presented by the first mobile device to the user to alert the user to the emergency situation.

A system includes a processor programmed to initiate executable operations. The executable operations include identifying an occurrence of an emergency situation pertinent to people presently located within a venue. The executable operations also can include, responsive to identifying the emergency situation pertinent to the people located within the venue, automatically communicating an emergency alert to a first mobile device, the emergency alert providing contextual information pertaining to the emergency situation, wherein the contextual information indicates precautions to be observed by the user, wherein the emergency alert is configured to be presented by the first mobile device to the user to alert the user to the emergency situation.

A computer program includes a computer readable storage medium having program code stored thereon. The program code is executable by a processor to perform a method. The method includes identifying, by the processor, an occurrence of an emergency situation pertinent to people presently located within a venue. The method also can include, responsive to identifying the emergency situation pertinent to the people located within the venue, automatically communicating, by the processor, an emergency alert to a first mobile device, the emergency alert providing contextual information pertaining to the emergency situation, wherein the contextual information indicates precautions to be observed by the user, wherein the emergency alert is configured to be presented by the first mobile device to the user to alert the user to the emergency situation.

BRIEF DESCRIPTION OF THE DRAWINGS

FIG. 2 is a flow chart illustrating an example of a method of communicating to a mobile device location specific emergency information.

DETAILED DESCRIPTION

Figure 1:
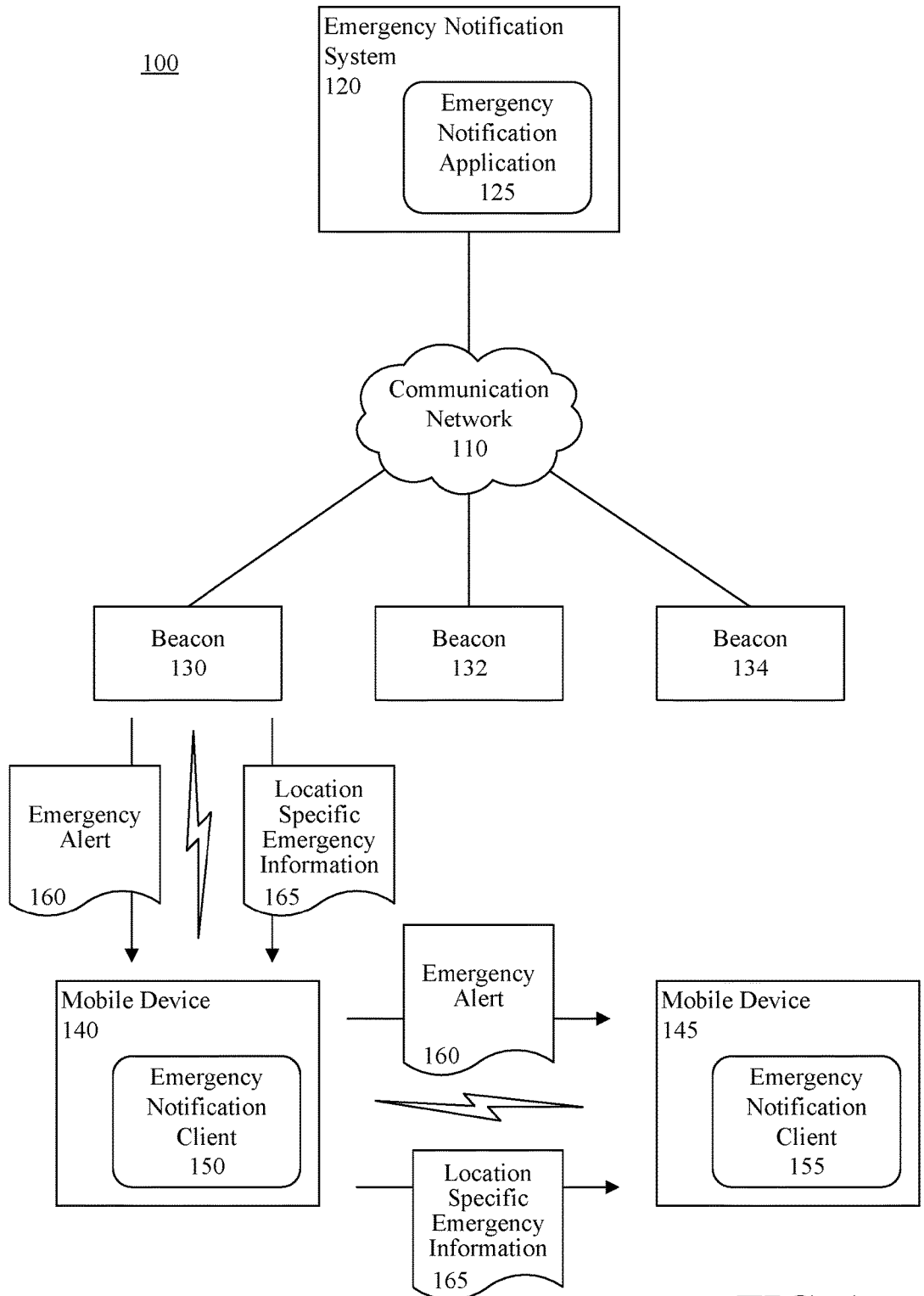
FIG. 1 is a block diagram illustrating an example of a communication system.

The present invention relates to mobile communications and, more particularly, to emergency related mobile communications. In accordance with the arrangements disclosed herein, responsive to identifying an occurrence of an emergency situation pertinent to people presently located within a venue, a system can communicate to a user's mobile device information pertinent to the emergency situation. In illustration, the system can automatically communicate to the mobile device an emergency alert providing contextual information pertaining to the emergency situation. The mobile device can present the emergency alert to the user. Further, the system can determine a present location of a mobile device within a venue, and communicate to the mobile device location specific emergency information describing an emergency plan for exiting the venue from the present location to an exit. The mobile device can present the emergency plan to the user. Accordingly, rather than having to look for exit signs to follow to exit the venue, the user can follow a route provided by the emergency plan. This can help the user to exit the structure more quickly.

Several definitions that apply throughout this document now will be presented.

As defined herein, the term "location" means a place within a venue where a user may be physically present.

As defined herein, the term "venue" means a place that physically exists in the real world. Examples of venues include, but are not limited to, physical structures such as buildings, hotels, motels, stores, malls, convention centers, stadiums, aircraft, vehicles (e.g., buses), watercraft (e.g., cruise ships, military ships, etc.), amusement parks and the like. As the term "venue" is defined herein, an on-line store and a virtual environment hosted by one or more processing systems are not venues.

As defined herein, the term "mobile device" means a processing system, including at least one processor and memory, with which a user directly interacts, which includes at least one transceiver, and which is configured to be carried or otherwise held by the user while the user interacts with the processing system. Examples of a mobile device include, but are not limited to, a smart phone, a personal digital assistant, a tablet computer, a mobile computer, a smart watch, smart glasses, and the like. Network infrastructure, such as routers, firewalls, switches, and the like, are not mobile devices as the term "mobile device" is defined herein. Displays and output audio transducers mounted to or carried by structures, such as walls, ceilings, carts or vehicles, also are not mobile devices as the term "mobile device" is defined herein. Notwithstanding, a mobile device may include a display and/or output audio transducer that is integrated with the mobile device.

As defined herein, the term "ad hoc communication link" means a peer-to-peer communication link between at least two devices that is created spontaneously instead of relying on a server or base station to coordinate the flow of messages between the at least two devices. An ad hoc communication link can be established over a WiFi® network, a mesh network, a personal area network (PAN), or any other suitable network.

As defined herein, the term "mesh network communication link" means a communication link between at least two devices that is created in a network in which each node of the network relays data for the network. All nodes in a mesh network cooperate in the distribution of data in the mesh network.

As defined herein, the term "personal area network" means a communication link between at least two devices over which wireless communication signals are communicated directly among the devices, for example using INSTEON®, IrDA®, Wireless USB, Bluetooth®, Z-Wave®, ZigBee® and/or body Area Network.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "output" means storing in memory elements, writing to display or other peripheral output device, sending or transmitting to another system, exporting, or the like.

As defined herein, the term "automatically" means without user intervention.

As defined herein, the term "user" means a person (i.e., a human being).

FIG. 1 is a block diagram illustrating an example of a communication system 100. The communication system 100 contains at least one communication network 110. The communication network 110 is the medium used to provide communications links between various devices and data processing systems connected together within communication system 100. The communication network 110 may include connections, such as wire, wireless communication links, or fiber optic cables. The communication network 110 may be implemented as, or include, any of a variety of different communication technologies such as a Wide Area Network (WAN), a Local Area Network (LAN), a wireless network, a mobile or cellular network, a Virtual Private Network (VPN), the Internet, the Public Switched Telephone Network (PSTN), or the like.

The communication system 100 also can include an emergency notification system 120 and a plurality of beacons 130, 132, 134, each of which may couple to the communication network 110. The communication system 100 also can include a plurality of mobile devices 140, 145. In one aspect of the present arrangements, one or more of the beacons 130-134 can be implemented as wireless access points, wireless routers, microcells or the like, and the mobile devices 140, 145 can couple to the communication network 110 via the beacons 130-134 to both receive and transmit messages via the communication network 110. In another aspect, the beacons 130-134 can be implemented as devices configured to transmit radio frequency (RF) and/or infrared (IR) messages that are detectable by one or more of the mobile devices 140, 145, but the beacons 130-134 need not be configured to relay messages transmitted by the mobile devices 140, 145 to the communication network 110.

The emergency notification system 120 may be implemented as one or more data processing systems (e.g., servers), each including at least one processor and memory, executing suitable operational software to support communication of emergency notifications to one or more of the mobile devices 140, 145. For example, the emergency notification system 120 can host an emergency notification application 125.

One or more of the mobile devices 140, 145 can include a respective emergency notification client 150, 155. An emergency notification client 150, 155 can be a stand-alone application executing on a respective mobile device 140, 145, or integrated into an operating system or other application executing on the respective mobile device 140, 145. By way of example, the emergency notification client 150 can be implemented as a service executing on the mobile device 140. In one arrangement, for example an arrangement in which the beacons 130-134 are wireless access points or wireless routers, the emergency notification client 150 can detect the mobile device 140 establishing network presence on a network (e.g., a subnet) to which the beacons 130-134 provides network access, and monitor messages received by the mobile device 140 via the wireless access points or wireless routers. In another arrangement, the emergency notification client 150 can monitor beacon signals generated by the beacons 130-134 and received by the mobile device 140. Regardless, responsive to receiving a message or beacon signal indicating an occurrence of an emergency situation pertinent people presently located within a venue, the emergency notification client 150 can implement any number of various processes responsive to such messages/signals, as will be described. The venue can be a building, a hotel, a motel, a stadium, a store, a shopping mall, an aircraft, a vehicle (e.g., a bus), a watercraft, an amusement park or the like.

In operation, the emergency notification system 120 can detect an occurrence of an emergency situation pertinent people presently located within a venue. For example, the emergency notification system 120 can detect a signal from one or more fire alarms indicating that a fire is present in the venue, detect a signal from one or more seismic sensors indicating that the venue has experienced an earthquake, detect a signal from one or more weather sensors indicating that a tornado is present in proximity to the venue, detect a signal from one or more acoustic sensors indicating gunshots are fired in the venue, detect a signal from one or more emergency alarms (e.g., fire alarms, silent alarms, etc.), or the like. In another example, the emergency notification system 120 can monitor information generated by news and/or social media websites, emergency response services, etc., and detect information that indicates an occurrence of emergency situation pertinent people presently located within a venue.

Responsive to detecting an occurrence of an emergency situation pertinent to people presently located within the venue, the emergency notification system 120 can communicate to the mobile device 140, as well as other mobile devices, an emergency alert 160 via one or more of the beacons 130-134. The emergency alert 160 can be communicated to the mobile device 140 via one or more of the beacons 130-134, and can be configured to be presented by the mobile device 140 to the user to alert the user to the emergency situation, for example via a display and/or output audio transducer of the mobile device 140. Accordingly, the mobile device 140 can present the emergency alert 160 to the user. The emergency alert 160 can provide contextual information pertaining to the emergency situation. The contextual information can, for example, indicate the nature of the emergency, actions to be taken by the user, precautions to be observed by the user, and the like.

In one arrangement, the emergency notification client 150 can continually monitor for beacons signals and/or messages. Responsive to detecting the emergency alert 160, the emergency notification client 150 can automatically present the emergency alert 160 on the mobile device 140. If the mobile device 140 presently is in sleep mode, the emergency notification client 150 can automatically take the mobile device 140 out of sleep mode to present the emergency alert 160. In another arrangement, the emergency notification client 150 can present the emergency alert 160 responsive to detecting a user input on the mobile device 140. For instance, the emergency notification client 150 can present the emergency alert 160 responsive to the user launching a web browser on the mobile device 140. In a further arrangement, responsive to the beacon 130 detecting the mobile device 140 attempting to access the communication network 110 via the beacon 130, the beacon 130 can intercept an HTTP request communicated by the mobile device 140 and re-direct the HTTP request to a particular website hosted by the emergency notification system 120 presenting the emergency alert 160. Such website can respond to the HTTP request by communicating one or more HTTP responses that include the emergency alert 160, and the web browser on the mobile device 140 can render the emergency alert 160 on the mobile device 140.

Further, in lieu of or in addition to the emergency alert 160, responsive to detecting the occurrence of the emergency situation, the emergency notification system 120 can communicate to the mobile device 140, as well as other mobile devices, location specific emergency information 165 via one or more of the beacons 130-134. The location specific emergency information 165 also can be configured to be presented by the mobile device 140 to the user, for example via a display and/or output audio transducer of the mobile device 140. Accordingly, the mobile device 140 can present the location specific emergency information 165 to the user. The location specific emergency information 165 can provide to the user emergency information that is specific to the user's location within the venue. For example, the location specific emergency information 165 can include one or more diagram or images providing a route for the user to exit the venue, one or more videos showing the route for the user to exit the venue, or the like. Such diagram(s), image(s) and/or video(s) also can present to the user contextual information pertaining to the emergency situation.

The user's location within the venue can be determined in any suitable manner. In one arrangement, the emergency notification system 120 can store in a computer-readable storage medium, which may be contained within the emergency notification system 120 or otherwise coupled to the emergency notification system 120, information indicating the location of each of the beacons 130-134. In this arrangement, the location specific emergency information 165 can be generated for each of the beacons 130-134, and the emergency notification system 120 can communicate to each of the beacons 130-134 respective location specific emergency information 165 to be communicated to mobile devices that are located in proximity to the respective beacons 130-134. For example, if the mobile device 140 is located proximate to the beacon 130, the mobile device 140 can receive the location specific emergency information 165 from the beacon 130. In some cases the mobile device 140 may receive signals from more than one beacon 130-134. In such cases, the emergency notification client 150 can be configured to receive and process the signal from the beacon 130 having the highest strength, and present to the user the location specific emergency information 165 contained in that signal.

In another arrangement, for example an arrangement in which one or more of the beacons 130-134 are wireless access points or wireless routers, the emergency notification system 120 can determine a present location of the mobile device 140 based on which beacon 130-134 the mobile device 140 is communicatively linked, or based on a position of the mobile device 140 determined by a global positioning system (GPS) receiver. In illustration, the mobile device 140 can include a GPS receiver and periodically communicate to the emergency notification system 120 messages indicating the present location of the mobile device 140. The emergency notification system 120 also can receive information from the beacons 130-134 relating to a strength of signals communicated between the beacons 130-134 and the mobile device 140 and, based on the strength of such signals, perform trilateration to determine the present location of the mobile device 140. Regardless, responsive to determining the present location of the mobile device 140 within the venue, the emergency notification system 120 can communicate to the mobile device 140 the location specific emergency information 165 that is based on the mobile device's present location.

Regardless of how the user's location within the venue is determined, the location specific emergency information 165 can include information that is specific to the present location of the mobile device 140, and thus the user. In illustration, the location specific emergency information 165 can include an emergency plan for exiting the venue from a present location of the mobile device 140 within the venue. For instance, the location specific emergency information 165 can safely guide the user from the present location to an exit of the venue. More particularly, the emergency notification system 120 can configure the location specific emergency information 165 to present to the user a route to safely get from the present location to the exit. The route can be predefined for the present location of the mobile device 140, or the emergency notification application 125 can dynamically determine the route by processing digitized information indicating passageways within the venue (e.g., doorways, openings, hallways, staircases, elevators, escalators, rooms, and the like), nature of the emergency situation, etc.

By way of example, if the emergency situation is a fire in the south side of the venue, the emergency notification system 120 can determine that the route should not include passageways in the south side of the venue. Hence, the emergency notification system 120 can automatically process information related to the emergency situation and information relating to the venue to determine a route from the present location to an exit that does not traverse through the south side of the venue, and that route can be communicated in the location specific emergency information 165. Such route can be considered to be safe for the user since it does not route the user through the portion of the venue where the fire is located. Similarly, if the emergency notification system 120 detects gun shots fired in the south side of the venue, or detects that a stairway is collapsed in the south side of the venue (e.g., due to an earthquake, tornado, hurricane, explosion, or the like), the emergency notification system 120 can automatically process such information to determine a safe route to get the user from the present location to the exit.

In one aspect of the present arrangements, for example an arrangement in which the user is an employee or contractor working in a venue that is a secured facility, the emergency notification system 120 also can store, or otherwise access (e.g., from an active directory) user security profiles and information indicating user level of security clearances that are required for users to access various passageways in the venue.

By way of example, assume that the secured facility includes various passageways that are restricted to users having a particular level of security clearance. The user of the mobile device 140 may not have a level of security clearance required to access all passageways in the secured facility. Thus, when determining the route from the present location of the mobile device 140 to an exit, the emergency notification system 120 can demine a level of security clearance assigned to the user and determine a route that does not require the user to be assigned a level of security clearance that is higher than that level of security clearance in order for the user to traverse the route. In this regard, the location specific emergency information 165 generated by the emergency notification system 120 can describe a route that does not include passageways for which the user does not have an assigned level of security clearance to enter. Such an arrangement can ensure that the user is able to safely reach an exit without being blocked by a door to a passage way for which the user does not have the proper level of security clearance to access.

In another aspect of the present arrangements, the location specific emergency information 165 generated by the emergency notification system 120 can describe a route that includes only passageways that do not require the user to be assigned a level of security clearance whatsoever. In yet another aspect of the present arrangements. The emergency notification system 120 can interface with one or more security systems in the venue to disable security requirements otherwise required for users to enter various secure passageways within the venue. For example, the emergency notification system 120 can interface with the security system(s) to unlock doors or configure the doors to become unlocked for any user presenting a user identification that is recognized by the security system(s) and/or the emergency notification system 120. Such an arrangements can ensure that the user is not blocked from accessing passage ways the user may need to traverse to safely reach the exit.

In another aspect of the present arrangements, rather than the emergency notification system 120 providing the emergency alert 160 and/or location specific emergency information 165, the beacon 130 can statically store the emergency alert 160 and/or location specific emergency information 165. Responsive to the beacon 130 receiving a message or other signal from the emergency notification system 120 indicating the occurrence of the emergency situation, the beacon 130 can begin transmitting the emergency alert 160 and/or location specific emergency information 165 to be received by mobile devices, such as the mobile device 140. The beacon 130 can repeatedly transmit the emergency alert 160 and/or location specific emergency information 165 until the beacon 130 receives a message or other signal to stop transmitting such information.

In another aspect of the present arrangements, the beacon 130 can receive updates to the emergency alert 160 and/or location specific emergency information 165, for example from the emergency notification system 120 and/or one or more other systems, and the beacon 130 can update the emergency alert 160 and/or location specific emergency information 165 accordingly. Responsive to updating the emergency alert 160 and/or location specific emergency information 165, the beacon 130 can begin transmitting the updated emergency alert 160 and/or location specific emergency information 165 in lieu of the previous emergency alert 160 and/or location specific emergency information 165.

In further aspects of the present arrangements, the mobile device 140 can be configured to share the emergency alert 160 and/or the location specific emergency information 165 received from the emergency notification system 120 with one or more other mobile devices, such as the mobile device 145. For example, the emergency notification client 150 can be configured to detect reception of the emergency alert 160 and/or the location specific emergency information 165 by the mobile device 140 and share such with the mobile device 145. In illustration, responsive to receiving the emergency alert 160 and/or the location specific emergency information 165, the mobile device 140 can establish an ad hoc communication link with the mobile device 145, for example a WiFi® communication link, a mesh network communication link and/or a personal area network (PAN) communication link.

In such an arrangement, the emergency notification client 150 can be configured to, in response to the mobile device 140 receiving the emergency alert 160 and/or the location specific emergency information 165, automatically initiate the mobile device 140 to broadcasts signals requesting communication links to other mobile devices, such as the mobile device 145. The emergency notification client 155 executing on the mobile device 145 can be configured to recognize such communication signals generated by the mobile device 140 and automatically initiate processes on the mobile device 145 to establish an ad hoc communication link between the mobile device 140 and the mobile device 145. Responsive to the ad hoc communication link being established, the mobile device 140 can communicate to the mobile device 145 the emergency alert 160 and/or the location specific emergency information 165. Moreover, the mobile device 145 can function as a hotspot, relaying communications exchanged between the mobile device 145 and the beacon 130, or between the mobile device 145 and the communication network 110.

In accordance with the above example, the mobile device 145 can receive from the mobile device 140 the emergency alert 160 and/or the location specific emergency information 165 even though the mobile device 145 may not be able to receive signals and/or messages from the beacons 130-134, which may be due to any number of reasons. For example, the WiFi® transceiver and/or cellular network transceiver of the mobile device 145 may be unable to communicate with the beacons 130, 134, while the PAN transceiver still is operative. Nonetheless, the mobile device 145 may be able to receive the emergency alert 160 and/or the location specific emergency information 165 via the PAN transceiver.

In a further arrangement, the beacon 130 can receive a distress signal from the mobile device 145, for example via a mesh network established among the mobile device 145 and the mobile device 140 and other mobile devices. Responsive to receiving the distress signal from the mobile device 145, the beacon 130 can communicate the distress signal to the mobile device 140 and/or one or more other beacons 132, 134 for sharing with other mobile devices. The emergency notification client 150 executing on the mobile device 140 can present the distress signal to the user of the mobile device 140. Accordingly, the user of the mobile device 140 can take action to aid the user of the mobile device 145.

Additionally, the beacons 130-134 can be members of the mesh network established among the mobile devices 140, 145, or the beacons 130-134 can form their own mesh network. Thus, if one or more of the beacons 130-134 lose connectivity to the communication network 110, other beacons can act as relays for the affected beacons. In illustration, if the beacon 130 loses connectivity to the communication network 110, the beacon 132 can serve to relay communications between the beacon 130 and the communication network 110.

FIG. 2 is a flow chart illustrating an example of a method 200 of communicating to a mobile device location specific emergency information. At step 205, an occurrence of an emergency situation pertinent to people located within the venue can be identified. At step 210, responsive to identifying the emergency situation pertinent to the people located within the venue, an emergency alert and location specific emergency information can be automatically communicated to a first mobile device. The location specific emergency information can describe an emergency plan for exiting the venue from a present location of the first mobile device within the venue, wherein the location specific emergency information is configured to be presented by the first mobile device to a user of the first mobile device to safely guide the user from the present location to an exit of the venue. At step 215, emergency propagation information can be automatically communicated to the first mobile device. The emergency propagation information can be configured to be processed by the first mobile device to initiate the first mobile device to establish a communication link with at least a second mobile device and communicate from the first mobile device to the second mobile device the emergency alert and the location specific emergency information.

Figure 3:
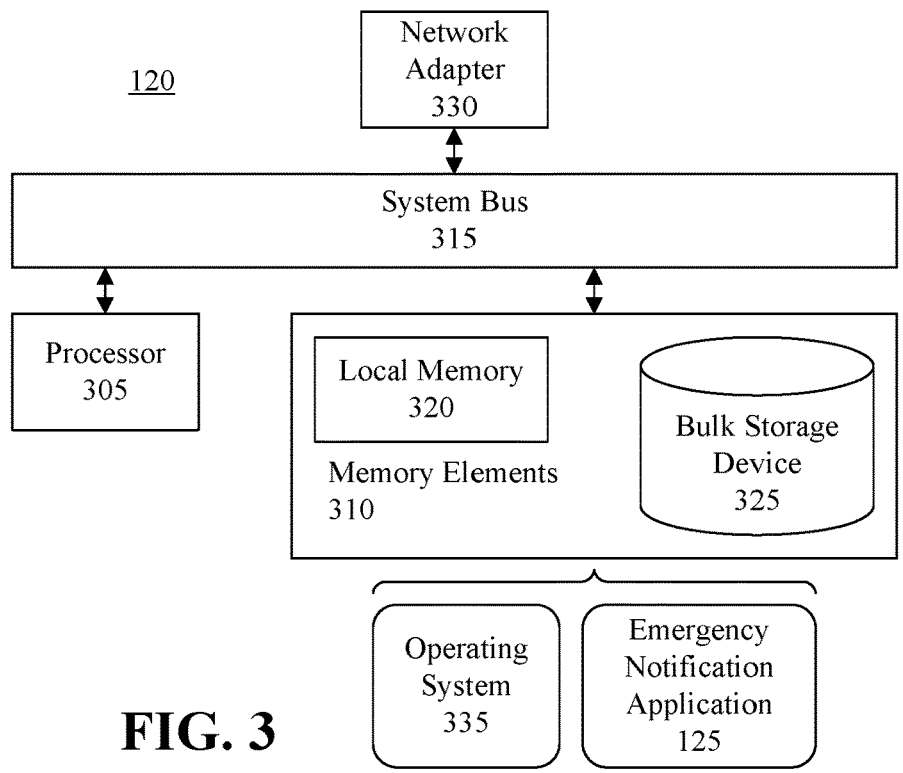
FIG. 3 is a block diagram illustrating example architecture for a data processing system.

FIG. 3 is a block diagram illustrating example architecture for the emergency notification system 120 of FIG. 1. The emergency notification system 120 can include at least one processor 305 (e.g., a central processing unit) coupled to memory elements 310 through a system bus 315 or other suitable circuitry. As such, the emergency notification system 120 can store program code within the memory elements 310. The processor 305 can execute the program code accessed from the memory elements 310 via the system bus 315. It should be appreciated that the emergency notification system 120 can be implemented in the form of any system including a processor and memory that is capable of performing the functions and/or operations described within this specification that are performed by the emergency notification system 120. For example, the emergency notification system 120 can be implemented as one or more hardware servers.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The emergency notification system 120 also can include one or more cache memories (not shown) that provide temporary storage of at least some program code in order to reduce the number of times program code must be retrieved from the bulk storage device 325 during execution.

One or more network adapters 330 can be coupled to emergency notification system 120 to enable the emergency notification system 120 to become coupled to other systems, computer systems, remote printers, and/or remote storage devices through intervening private or public networks. Modems, cable modems, transceivers, and Ethernet cards are examples of different types of network adapters 330 that can be used with the emergency notification system 120.

As pictured in FIG. 3, the memory elements 310 can store components of the emergency notification system 120, for example an operating system 335 and the emergency notification application 125 of FIG. 1. Being implemented in the form of executable program code, the operating system 335 and the emergency notification application 125 can be executed by the processor 305. For example, the processor 305 can execute the emergency notification application 125 within a computing environment provided by the operating system 335 in order to perform the processes described herein that are performed by the emergency notification system 120. As such, the operating system 335 and the emergency notification application 125 can be considered part of the emergency notification system 120. Moreover, the operating system 335 and the emergency notification application 125 are functional data structures that impart functionality when employed as part of the emergency notification system 120.

Figure 4:
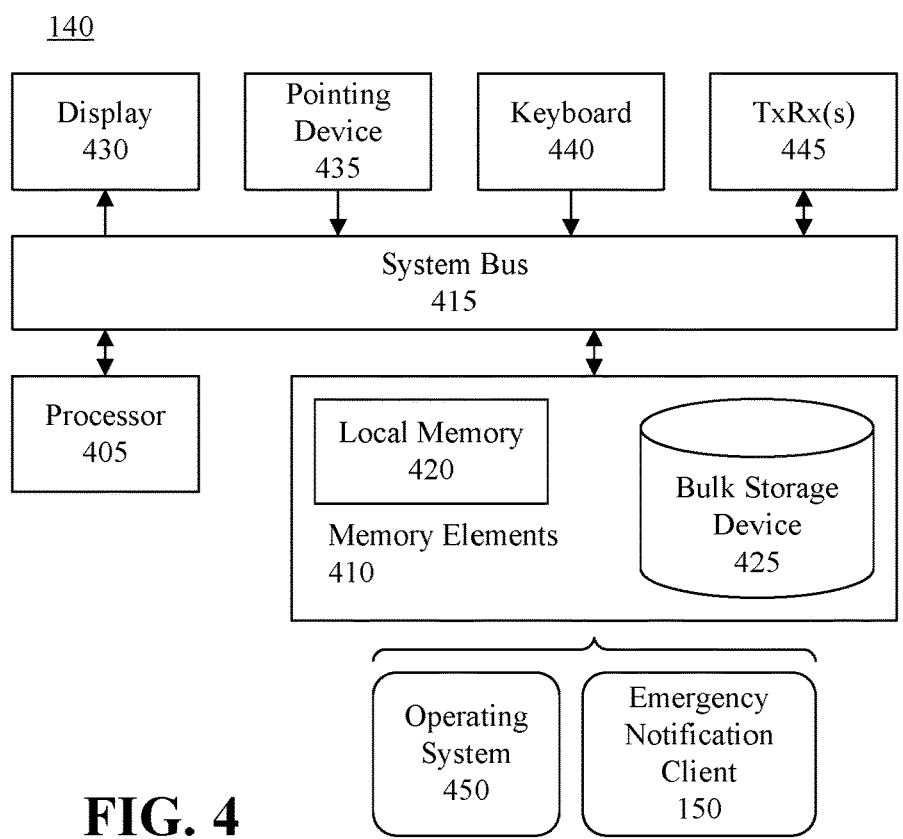
FIG. 4 is a block diagram illustrating example architecture for a mobile device.

FIG. 4 is a block diagram illustrating example architecture for the mobile device 140 of FIG. 1. The mobile device 140 can include at least one processor 405 (e.g., a central processing unit) coupled to memory elements 410 through a system bus 415 or other suitable circuitry. As such, the mobile device 140 can store program code within the memory elements 410. The processor 405 can execute the program code accessed from the memory elements 410 via the system bus 415. It should be appreciated that the mobile device 140 can be implemented in the form of any system including a processor and memory that is capable of performing the functions and/or operations described within this specification that are performed by the mobile device 140.

The memory elements 410 can include one or more physical memory devices such as, for example, local memory 420 and one or more bulk storage devices 425. The mobile device 140 also can include one or more cache memories (not shown) that provide temporary storage of at least some program code in order to reduce the number of times program code must be retrieved from the bulk storage device 425 during execution.

Input/output (I/O) devices such as a display 430, a pointing device 435 and, optionally, a keyboard 440 can be coupled to the mobile device 140. The I/O devices can be coupled to the mobile device 140 either directly or through intervening I/O controllers. For example, the display 430 can be coupled to the mobile device 140 via a graphics processing unit (GPU), which may be a component of the processor 405 or a discrete device. One or more transceivers 445 also can be coupled to mobile device 140 to enable the mobile device 140 to become coupled to other systems, computer systems, remote printers, and/or remote storage devices through intervening private or public networks. Examples of the transceivers 445 include, but are not limited to, cellular communication modems, WiFi® network adapters, PAN transceivers, and the like.

As pictured in FIG. 4, the memory elements 410 can store the components of the mobile device 140, for example an operating system 450 and the emergency notification client 150. Being implemented in the form of executable program code, the operating system 450 and the emergency notification client 150 can be executed by the processor 305. For example, the processor 305 can execute the emergency notification client 150 within a computing environment provided by the operating system 450 in order to perform the processes described herein that are performed by the mobile device 140. As such, the operating system 450 and the emergency notification client 150 can be considered part of the mobile device 140. Moreover, the operating system 450 and the emergency notification client 150 are functional data structures that impart functionality when employed as part of the mobile device 140.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
identifying an occurrence of an emergency situation pertinent to people presently located within a venue; and
responsive to identifying the emergency situation pertinent to the people located within the venue:
determining a first level of security clearance assigned to a user located within the venue;
automatically determining a present location within the venue of a first mobile device of the user;
determining a route, from the present location within the venue of the first mobile device to an exit of the venue, which does not require the user to be assigned a second level of security clearance that is higher than the first level of security clearance for the user to traverse the route; and
automatically communicating, to the first mobile device, an emergency alert and an emergency plan for exiting the venue, wherein the emergency plan for exiting the venue describes the route, the emergency alert providing contextual information pertaining to the emergency situation, wherein the contextual information indicates precautions to be observed by the user, wherein the emergency alert is configured to be presented by the first mobile device to the user to alert the user to the emergency situation.

2. The method of claim 1, further comprising:
automatically communicating to the first mobile device emergency propagation information, the emergency propagation information configured to be processed by the first mobile device to initiate the first mobile device to establish a communication link with at least a second mobile device and communicate from the first mobile device to the second mobile device the emergency alert.

3. The method of claim 2, wherein the communication link established between the first mobile device and the second mobile device is an ad hoc communication link established in response to the first mobile device receiving the emergency propagation information.

4. The method of claim 1, further comprising:
automatically determining the present location within the venue of the first mobile device;
automatically selecting location specific emergency information describing the emergency plan for exiting the venue based on the present location within the venue of the first mobile device; and
automatically communicating the location specific emergency information to the first mobile device.

5. The method of claim 4, further comprising:
automatically communicating to the first mobile device emergency propagation information, the emergency propagation information configured to be processed by the first mobile device to initiate the first mobile device to establish a communication link with at least a second mobile device and communicate from the first mobile device to the second mobile device the location specific emergency information.

6. The method of claim 1, further comprising:
receiving a distress signal from a second mobile device; and
communicating the distress signal to the first mobile device, wherein the first mobile device is configured to present the distress signal to the user of the first mobile device.

7. The method of claim 1, wherein automatically communicating, to the first mobile device, the emergency plan for exiting the venue comprises communicating to the first mobile device at least one image, diagram or video showing the route for the user to exit the venue.

8. A system, comprising:
a processor programmed to initiate executable operations comprising:
identifying an occurrence of an emergency situation pertinent to people presently located within a venue; and
responsive to identifying the emergency situation pertinent to the people located within the venue:
determining a first level of security clearance assigned to a user located within the venue;
automatically determining a present location within the venue of a first mobile device of the user;
determining a route, from the present location within the venue of the first mobile device to an exit of the venue, which does not require the user to be assigned a second level of security clearance that is higher than the first level of security clearance for the user to traverse the route; and
automatically communicating, to the first mobile device, an emergency alert and an emergency plan for exiting the venue, wherein the emergency plan for exiting the venue describes the route, the emergency alert providing contextual information pertaining to the emergency situation, wherein the contextual information indicates precautions to be observed by the user, wherein the emergency alert is configured to be presented by the first mobile device to the user to alert the user to the emergency situation.

9. The system of claim 8, the executable operations further comprising:
automatically communicating to the first mobile device emergency propagation information, the emergency propagation information configured to be processed by the first mobile device to initiate the first mobile device to establish a communication link with at least a second mobile device and communicate from the first mobile device to the second mobile device the emergency alert.

10. The system of claim 9, wherein the communication link established between the first mobile device and the second mobile device is an ad hoc communication link established in response to the first mobile device receiving the emergency propagation information.

11. The system of claim 8, the executable operations further comprising:
automatically determining the present location within the venue of the first mobile device;
automatically selecting location specific emergency information describing an emergency plan for exiting the venue based on the present location within the venue of the first mobile device; and
automatically communicating the location specific emergency information to the first mobile device.

12. The system of claim 11, the executable operations further comprising:
automatically communicating to the first mobile device emergency propagation information, the emergency propagation information configured to be processed by the first mobile device to initiate the first mobile device to establish a communication link with at least a second mobile device and communicate from the first mobile device to the second mobile device the location specific emergency information.

13. The system of claim 8, the executable operations further comprising:
receiving a distress signal from a second mobile device; and
communicating the distress signal to the first mobile device, wherein the first mobile device is configured to present the distress signal to the user of the first mobile device.

14. The system of claim 8, wherein automatically communicating, to the first mobile device, the emergency plan for exiting the venue comprises communicating to the first mobile device at least one image, diagram or video showing the route for the user to exit the venue.

15. A computer program product comprising a computer readable storage medium having program code stored thereon, the program code executable by a processor to perform a method comprising:
identifying, by the processor, an occurrence of an emergency situation pertinent to people presently located within a venue; and
responsive to identifying the emergency situation pertinent to the people located within the venue:
determining a first level of security clearance assigned to a user located within the venue;
automatically determining a present location within the venue of a first mobile device of the user;
determining a route, from the present location within the venue of the first mobile device to an exit of the venue, which does not require the user to be assigned a second level of security clearance that is higher than the first level of security clearance for the user to traverse the route; and
automatically communicating, by the processor to the first mobile device, an emergency alert and an emergency plan for exiting the venue, wherein the emergency plan for exiting the venue describes the route, the emergency alert providing contextual information pertaining to the emergency situation, wherein the contextual information indicates precautions to be observed by the user, wherein the emergency alert is configured to be presented by the first mobile device to the user to alert the user to the emergency situation.

16. The computer program product of claim 15, the method further comprising:
automatically communicating to the first mobile device emergency propagation information, the emergency propagation information configured to be processed by the first mobile device to initiate the first mobile device to establish a communication link with at least a second mobile device and communicate from the first mobile device to the second mobile device the emergency alert.

17. The computer program product of claim 16, wherein the communication link established between the first mobile device and the second mobile device is an ad hoc communication link established in response to the first mobile device receiving the emergency propagation information.

18. The computer program product of claim 15, the method further comprising:
automatically determining the present location within the venue of the first mobile device;
automatically selecting location specific emergency information describing the emergency plan for exiting the venue based on the present location within the venue of the first mobile device; and
automatically communicating the location specific emergency information to the first mobile device.

19. The computer program product of claim 18, the method further comprising:
automatically communicating to the first mobile device emergency propagation information, the emergency propagation information configured to be processed by the first mobile device to initiate the first mobile device to establish a communication link with at least a second mobile device and communicate from the first mobile device to the second mobile device the location specific emergency information.

20. The computer program product of claim 15, wherein automatically communicating, by the processor to the first mobile device, the emergency plan for exiting the venue comprises communicating to the first mobile device at least one image, diagram or video showing the route for the user to exit the venue.

* * * * *